(12) United States Patent
Arai et al.

(10) Patent No.: US 11,799,141 B2
(45) Date of Patent: Oct. 24, 2023

(54) CHARGING CONTROL APPARATUS

(71) Applicant: SUBARU CORPORATION, Tokyo (JP)

(72) Inventors: Yoshitaka Arai, Tokyo (JP); Mami Osawa, Tokyo (JP); Jun Kikuchi, Tokyo (JP); Daichi Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 135 days.

(21) Appl. No.: 17/476,013

(22) Filed: Sep. 15, 2021

(65) Prior Publication Data

US 2022/0089050 A1 Mar. 24, 2022

(30) Foreign Application Priority Data

Sep. 24, 2020 (JP) .................. 2020-159333

(51) Int. Cl.
*H02J 7/00* (2006.01)
*H01M 10/44* (2006.01)
*B60L 53/22* (2019.01)
*H02J 7/14* (2006.01)
*B60L 58/22* (2019.01)
*H02J 7/34* (2006.01)

(52) U.S. Cl.
CPC .......... *H01M 10/441* (2013.01); *B60L 53/22* (2019.02); *B60L 58/22* (2019.02); *H02J 7/0014* (2013.01); *H02J 7/1423* (2013.01); *H01M 2220/20* (2013.01); *H02J 7/342* (2020.01); *H02J 2310/48* (2020.01)

(58) Field of Classification Search
CPC ............. H01M 10/441; H01M 2220/20; H02J 7/0014; H02J 7/1423; H02J 2310/48; B60L 53/22; B60L 58/22
USPC ....... 320/109, 103, 116–119; 701/22; 307/66
See application file for complete search history.

(56) References Cited

U.S. PATENT DOCUMENTS

| 2004/0018397 | A1* | 1/2004 | Nagai | H01M 10/44 429/61 |
| 2012/0187898 | A1* | 7/2012 | Nysen | H02J 7/0014 320/118 |
| 2012/0299552 | A1 | 11/2012 | Machida | |
| 2015/0054464 | A1* | 2/2015 | Suzuki | H01M 50/213 320/112 |
| 2019/0275900 | A1* | 9/2019 | Niimi | B60L 58/10 |

FOREIGN PATENT DOCUMENTS

JP 2012-244888 A 12/2012

* cited by examiner

*Primary Examiner* — Zixuan Zhou
(74) *Attorney, Agent, or Firm* — TROUTMAN PEPPER HAMILTON SANDERS LLP

(57) ABSTRACT

A charging control apparatus includes a battery, an electric charge mover, and a processor. The battery includes multiple cells. The electric charge mover is configured to move electric charge between the multiple cells. The processor is configured to, upon charging the battery, cause the electric charge mover to move the electric charge of one or more cells serving as a part of the multiple cells to another one or more cells of the multiple cells, and perform a partial charging that charges the one or more cells serving as the part of the multiple cells after causing the electric charge mover to move the electric charge.

12 Claims, 3 Drawing Sheets

CHARGING CONTROL APPARATUS

CROSS-REFERENCE TO RELATED APPLICATION

The present application claims priority from Japanese Patent Application No. 2020-159333 filed on Sep. 24, 2020, the entire contents of which are hereby incorporated by reference.

BACKGROUND

The technology relates to a charging control apparatus configured to charge a battery.

A vehicle such as an electric vehicle or a hybrid electric vehicle has been proposed that is configured to charge a battery provided in the vehicle from the outside. For example, reference is made to Japanese Unexamined Patent Application Publication No. 2012-244888. The battery of such a vehicle may be a lithium-ion secondary battery that is large in capacity and allows for high-voltage operations.

SUMMARY

An aspect of the technology provides a charging control apparatus that includes a battery, an electric charge mover, and a processor. The battery includes multiple cells. The electric charge mover is configured to move electric charge between the multiple cells. The processor is configured to, upon charging the battery, cause the electric charge mover to move the electric charge of one or more cells serving as a part of the multiple cells to another one or more cells of the multiple cells, and perform a partial charging that charges the one or more cells serving as the part of the multiple cells after causing the electric charge mover to move the electric charge.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
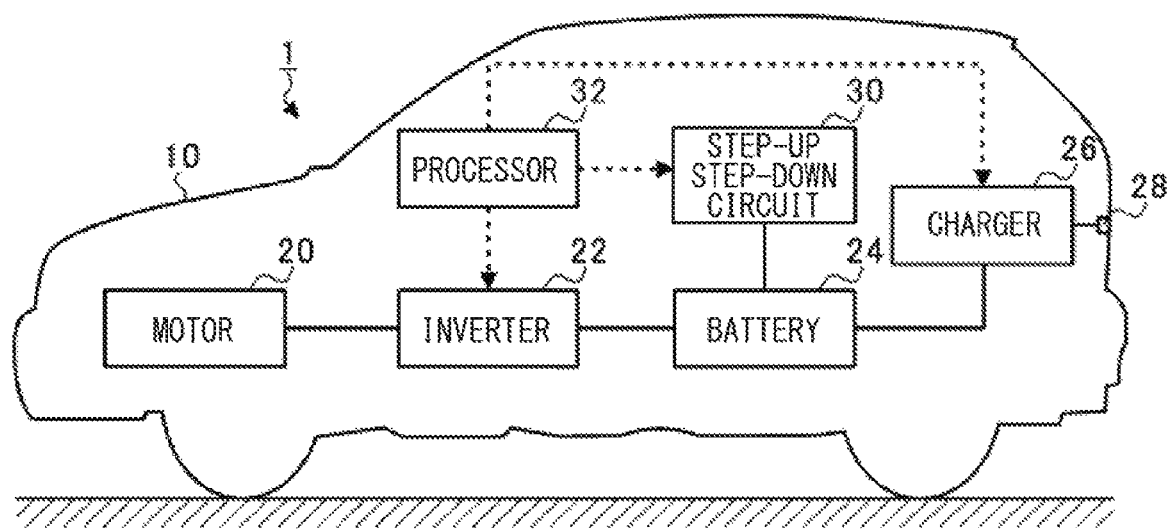
FIG. 1 is a diagram schematically illustrating a configuration of a charging control apparatus according to one example embodiment of the technology.

A battery involves a rapid decrease in allowable input electric power that indicates an amount of electric power suppliable to the battery, in a case where a state of charge (SOC), or a charging rate, increases. Accordingly, a charging efficiency of the battery per time can become relatively low upon high SOC. What is desired is a technique that improves the charging efficiency upon charging the battery whose SOC is high.

It is desirable to provide a charging control apparatus that makes it possible to improve a charging efficiency.

In the following, some embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

FIG. 1 schematically illustrates a configuration of a charging control apparatus 1 according to an example embodiment of the technology. Referring to FIG. 1, the charging control apparatus 1 may be provided in a vehicle 10. The charging control apparatus 1 includes a battery 24, a step-up step-down circuit 30, and a processor 32. The charging control apparatus 1 may also include a motor 20, an inverter 22, a charger 26, and a charging plug 28. For example, the vehicle 10 may be an electric vehicle or a hybrid electric vehicle.

The motor 20 may output power that drives drive wheels of the vehicle 10. For example, the motor 20 may be a three-phase alternating-current motor. The motor 20 may be coupled to the battery 24 via the inverter 22. The motor 20 may receive a supply of electric power from the battery 24 via the inverter 22. The motor 20 may drive the drive wheels by means of the electric power supplied from the battery 24.

The motor 20 may serve as a generator that generates electricity through regeneration by means of a kinetic energy of the drive wheels upon deceleration of the vehicle 10. The electric power generated through the regeneration by the motor 20 may be supplied to the battery 24 via the inverter 22, thereby charging the battery 24.

The inverter 22 may be an electric power converter that performs bidirectional electric power conversion. For example, the inverter 22 may include a multiphase bridge circuit. The inverter 22 may be configured to convert direct-current electric power supplied from the battery 24 into alternating-current electric power and supply the thus-converted alternating-current electric power to the motor 20. The inverter 22 may also convert alternating-current electric power, generated by the motor 20 through the regeneration, into direct-current electric power and supply the thus-converted direct-current electric power to the battery 24. The inverter 22 may include switching devices. The inverter 22 may perform the electric power conversion on the basis of a control of operation of the switching devices performed by the processor 32.

The battery 24 may be coupled to the charging plug 28 via the charger 26. The charging plug 28 may be configured to be coupled to an external power supply. The charger 26 may include a rectifier circuit and a charging switch, for example. The rectifier circuit of the charger 26 may convert alternating-current electric power, supplied from the external power supply via the charging plug 28, into direct-current electric power and supply the thus-converted direct-current electric power to the battery 24, thereby charging the battery 24. The charging switch of the charger 26 may turn on and off an electrical connection between the external power supply and the battery 24.

The battery 24 may be coupled to the step-up step-down circuit 30. In one embodiment, the step-up step-down circuit 30 may serve as an "electric charge mover". In some embodiments, the step-up step-down circuit 30 may be a bidirectional DC-DC converter. The step-up step-down circuit 30 moves electric charge between a plurality of cells structuring the battery 24.

The processor 32 may be or may include a semiconductor integrated circuit. For example, the semiconductor integrated circuit may include a central processing unit (CPU), a read-only memory (ROM) that contains a program, etc., and a random-access memory (RAM) that serves as a work area. The processor 32 may execute the program to control operations of the inverter 22, the charger 26, and the step-up step-down circuit 30. For example, the processor 32 may control the operation of the switching devices of the inverter 22. The processor 32 may turn on the charging switch of the charger 26 upon starting the charging from the external power supply, and may turn off the charging switch of the charger 26 upon stopping the charging from the external power supply. It should be noted that a control of the step-up step-down circuit 30 performed by the processor 32 will be described later in greater detail.

Figure 2:
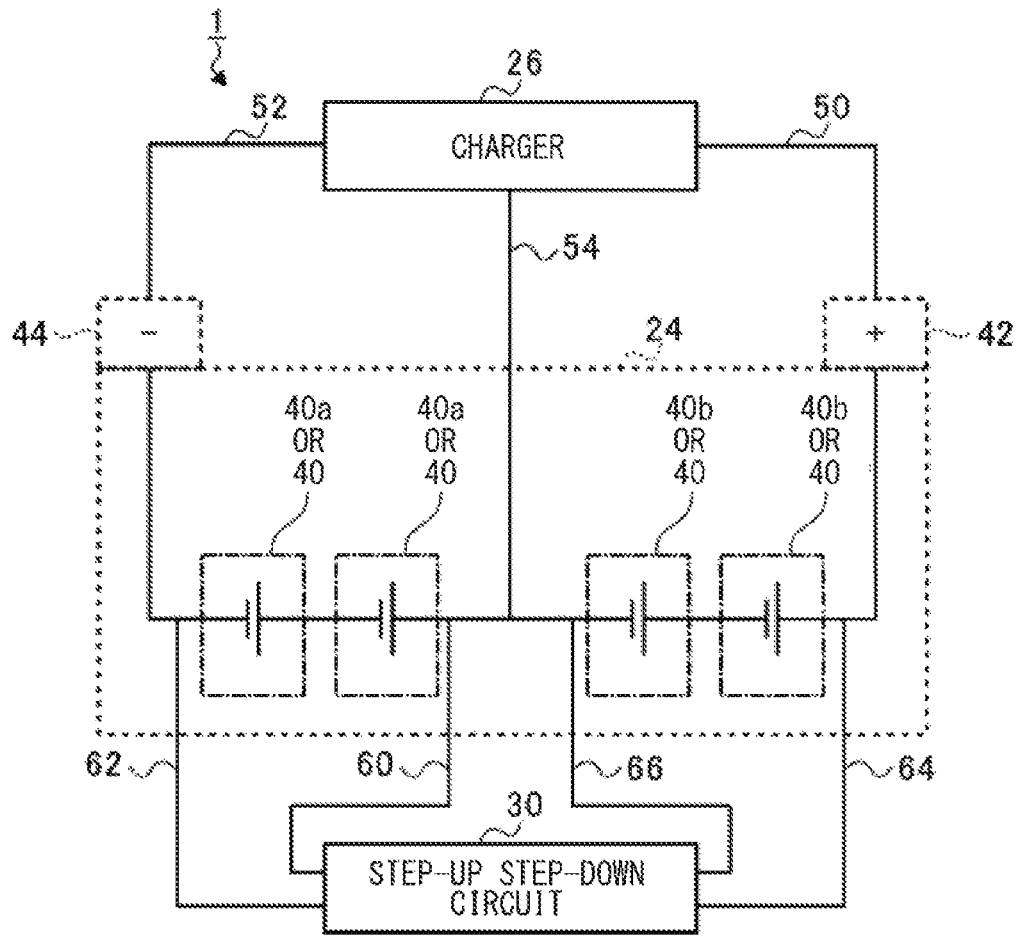
FIG. 2 is a diagram schematically illustrating a relationship of connection between a battery, a charger, and a step-up step-down circuit illustrated in FIG. 1.

FIG. 2 schematically illustrates a relationship of connection between the battery 24, the charger 26, and the step-up step-down circuit 30. It should be noted that a solid line illustrated in FIG. 2 indicates an electric wiring line. Referring to FIG. 2, the battery 24 includes a plurality of cells 40. The cell 40 may be a lithium-ion secondary battery. In some embodiments, the battery 24 may be a lithium-ion secondary battery. The plurality of cells 40 may be coupled in series.

It should be noted that only four cells 40 are illustrated in FIG. 2 for description purpose; however, the battery 24 may include about tens of cells 40 or about hundreds of cells 40 in practice. It should also be noted that, in the following description, out of the four cells 40 illustrated in FIG. 2, two cells 40 on the left side of the drawing are sometimes referred to as "first cells 40a" and two cells 40 on the right side of the drawing are sometimes referred to as "second cells 40b". The number of first cells 40a and the number of second cells 40b are optional and may be set on an as-necessary basis depending on design requirements, etc.

The battery 24 may have a positive terminal 42 and a negative terminal 44. The plurality of cells 40 may be disposed in series between the positive terminal 42 and the negative terminal 44. The positive terminal 42 may be coupled to a positive electrode of the cell 40 that is disposed closest to a positive electrode side out of the plurality of cells 40. The negative terminal 44 may be coupled to a negative electrode of the cell 40 that is disposed closest to a negative electrode side out of the plurality of cells 40.

The charger 26 may be coupled to the positive terminal 42 via a charging positive line 50. The charger 26 may be coupled to the negative terminal 44 via a charging negative line 52. The charger 26 may be coupled to a location between the first cells 40a and the second cells 40b via a charging bypass line 54.

The step-up step-down circuit 30 may be coupled, via a first positive line 60, to a location between the first cells 40a and the second cells 40b. The step-up step-down circuit 30 may be coupled, via a first negative line 62, to the negative electrode of the first cell 40a that is disposed closest to the negative electrode side out of the plurality of first cells 40a. The step-up step-down circuit 30 may also be coupled, via a second positive line 64, to the positive electrode of the second cell 40b that is disposed closest to the positive electrode side out of the plurality of second cells 40b. Further, the step-up step-down circuit 30 may be coupled, via a second negative line 66, to a location that is between the first cells 40a and the second cells 40b and that is closer to the second cells 40b than the first positive line 60 and the charging bypass line 54.

The step-up step-down circuit 30 may adjust a voltage between the first positive line 60 and the second positive line 64 and a voltage between the second positive line 64 and the second negative line 66. Thus, the step-up step-down circuit 30 may move the electric charge stored in the first cells 40a to the second cells 40b or move the electric charge stored in the second cells 40b to the first cells 40a.

In a case where a supply of electric power from the external power supply is started, the charger 26 may supply, via the charging positive line 50 and the charging negative line 52, the electric power supplied from the external power supply to the battery 24. Thus, all of the cells 40 of the battery 24 may be charged. In the following, the charging to be performed on all of the cells 40 together is referred to as a "regular charging".

Figure 3:
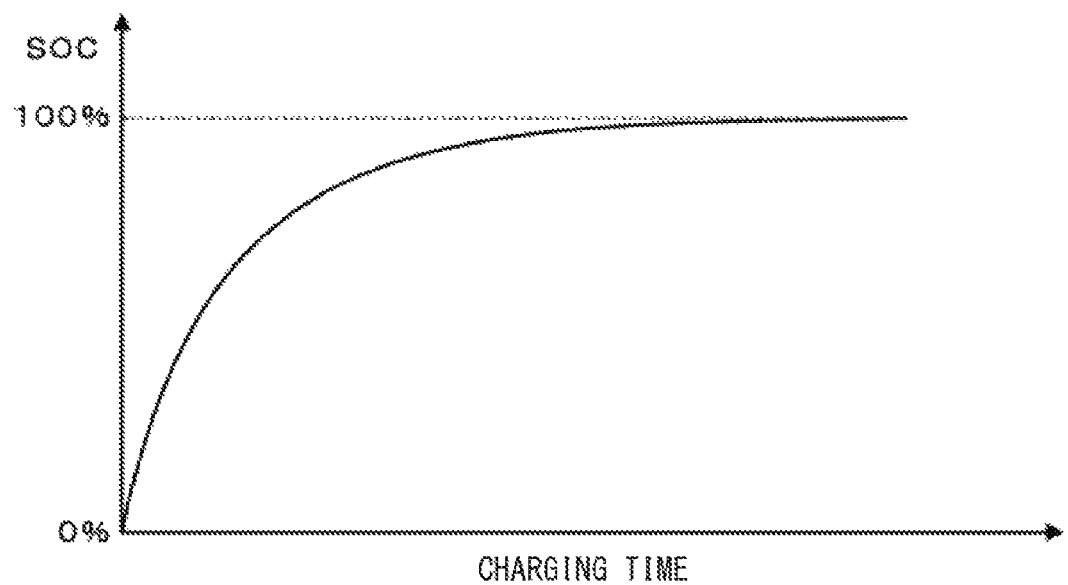
FIG. 3 is a diagram illustrating a relationship between SOC of a cell and a charging time.

FIG. 3 illustrates a relationship between the SOC of the cell 40 and a charging time. In one embodiment, the SOC may serve as a "charging rate". Referring to FIG. 3, the cell 40 of the battery 24 is high in allowable input electric power in a case where the SOC is low, which means that a charging amount per time, i.e., a charging efficiency per time, is high. The cell 40 of the battery 24, however, involves a rapid decrease in the allowable input electric power in a case where the SOC increases. In this case, the charging amount per time, i.e., the charging efficiency per time, becomes low.

Accordingly, upon charging the battery 24 within a limited time, the low charging efficiency per time in a case where the SOC of the cell 40 is high makes it difficult to charge the battery 24 efficiently.

To address this, the charging control apparatus 1 performs a partial charging that charges only the first cells 40a, besides the regular charging described above.

Upon performing the partial charging, the processor 32 first causes the electric charge stored in the first cells 40a to be moved to the second cells 40b. Thereafter, the processor 32 performs the partial charging, i.e., causes only the first cells 40a to be charged. It should be noted that the SOC of the first cells 40a becomes low owing to the movement of the electric charge from the first cells 40a to the second cells 40b. Thus, the first cells 40a becomes high in the allowable input electric power and becomes high in the charging efficiency per time. Hence, the charging control apparatus 1 makes it possible to improve the charging efficiency. In the following, a description is given of an example of the partial charging in greater detail.

Figure 4A:
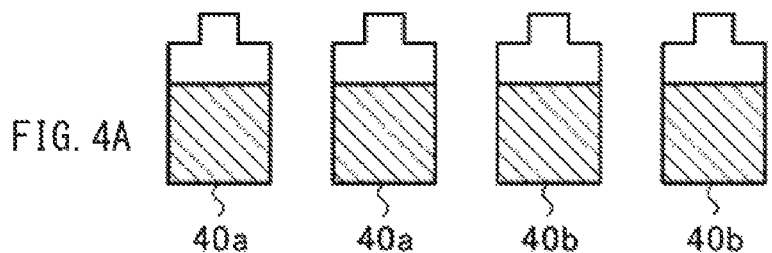
FIGS. 4A to 4C are diagrams each illustrating an example of how a partial charging works.
Figure 4B:
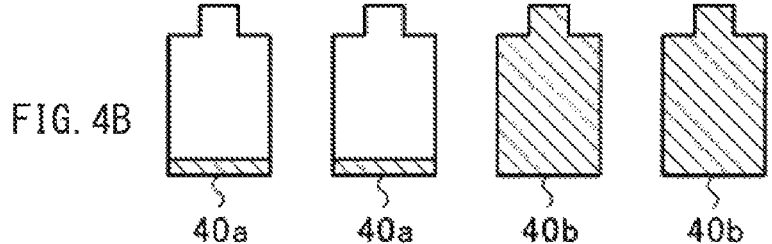
Figure 4C:
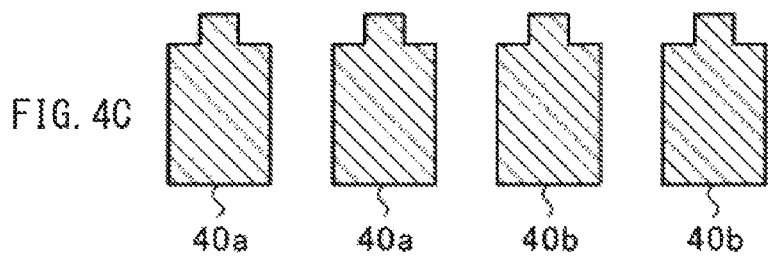

FIGS. 4A to 4C each illustrate an example of how the partial charging works. It should be noted that, in FIGS. 4A to 4C, a hatched part denotes a remaining capacity and a total of a white part and the hatched part denotes a full charge capacity. In other words, a ratio of the hatched part to the total of the white part and the hatched part corresponds to the SOC.

FIG. 4A illustrates an example in which the SOCs of the first cells 40a and the second cells 40b of the battery 24 are nearly equal to each other. In a case where the external power supply is coupled via the charging plug 28, the processor 32 may determine whether predetermined conditions for performing the partial charging are satisfied. Non-limiting examples of the predetermined conditions may include whether performing the partial charging is better in the charging efficiency than performing the regular charging and whether it is possible to move the electric charge from the first cells 40a to the second cells 40b before the start of the charging.

In a case where any of the predetermined conditions for performing the partial charging is unsatisfied, the processor 32 may perform the regular charging in which the electric power supplied from the external power supply is supplied to all of the cells 40 via the charging positive line 50 and the charging negative line 52.

In a case where the predetermined conditions for performing the partial charging are satisfied, the processor 32 may control the step-up step-down circuit 30 to move the electric charge from the first cells 40a provided between the first positive line 60 and the second positive line 64 to the second cells 40b provided between the second positive line 64 and the second negative line 66. Thus, the SOC of the first cells 40a decreases and the SOC of the second cells 40b increases as illustrated in FIG. 4B.

After the completion of the movement of the electric charge from the first cells 40a to the second cells 40b, the processor 32 may perform the partial charging that supplies the electric power, supplied from the external power supply, to the first cells 40a via the charging negative line 52 and the charging bypass line 54. Thus, only the first cells 40a of the battery 24 are charged.

Referring to FIG. 4C, the processor 32 may end the partial charging after the completion of the charging of the first cells 40a. In some embodiments, in a case where the SOCs are not the same as each other between the first cells 40a and the second cells 40b after the partial charging, the processor 32 may perform a so-called cell balancing in which the processor 32 controls the step-up step-down circuit 30 to move the electric charge from the first cells 40a or the second cells 40b whose SOC is high to the second cells 40b or the first cells 40a whose SOC is low. This configuration makes it possible to reduce an occurrence of a significant difference in the SOC between the first cells 40a and the second cells 40b.

As described above, the charging control apparatus 1 moves the electric charge in the first cells 40a serving as a part of the cells 40 to other second cells 40b out of the cells 40 to cause the SOC of the first cells 40a to be decreased, and performs the partial charging that charges only the first cells 40a in which the SOC is thus decreased. Hence, it is possible to improve the charging efficiency even in a case where it is not possible to take enough time for the charging.

In some embodiments, the charging control apparatus 1 may perform the regular charging that charges all of the cells 40. Hence, it is possible for the charging control apparatus 1 to charge the battery 24 by any of the partial charging and the regular charging that is better in the charging efficiency.

Figure 5:
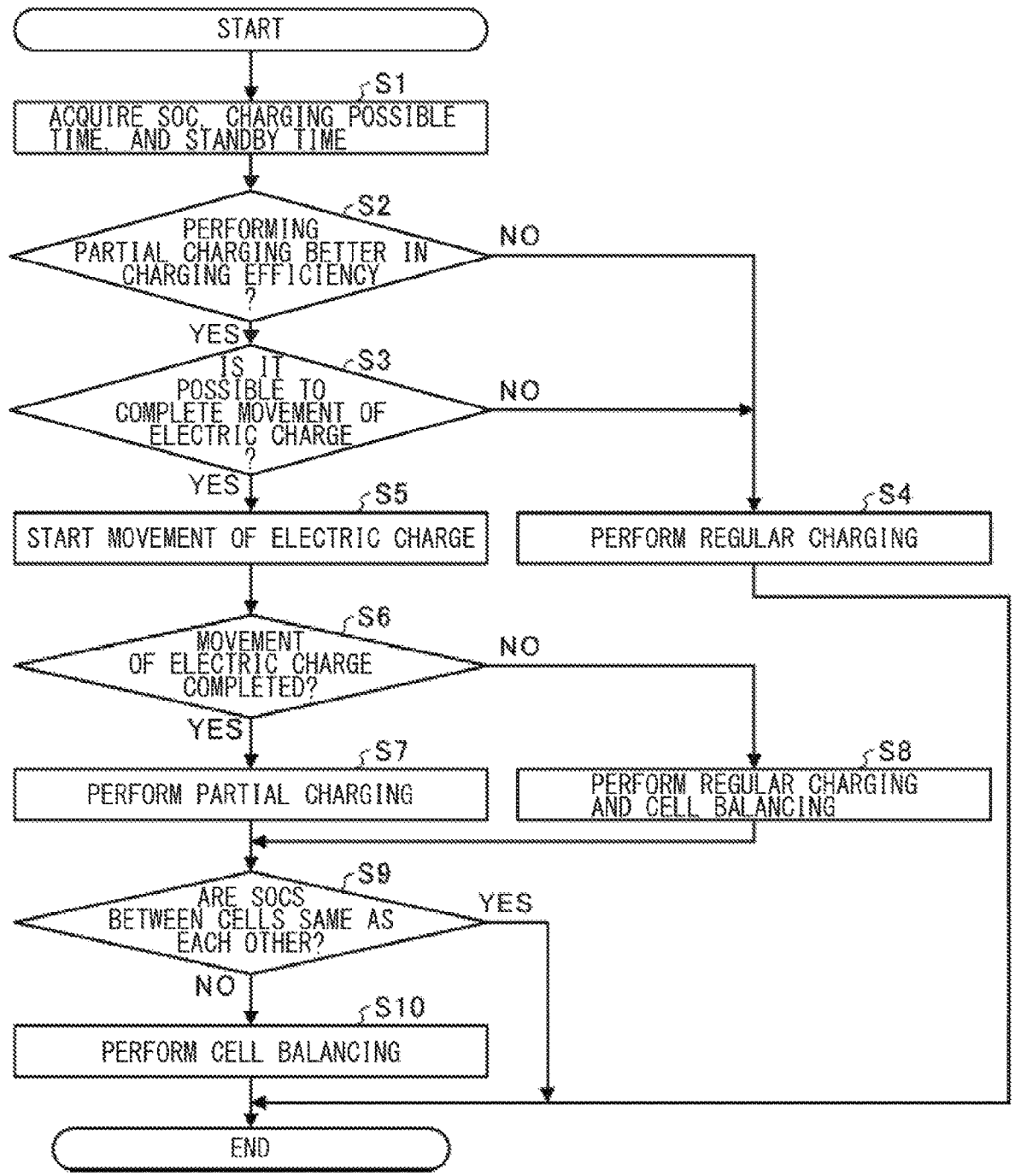
FIG. 5 is a flowchart illustrating an example of a flow of a charging control process.

FIG. 5 is a flowchart illustrating an example of a flow of a charging control process. The processor 32 may start the charging control process illustrated by way of example in FIG. 5 upon charging the battery 24 by the electric power supplied from the external power supply. Upon the start of the charging control process, the processor 32 may acquire the SOC of the battery 24 (step S1). For example, the processor 32 may acquire the SOC through integrating a current value of the battery 24. The processor 32 may acquire the SOC by any other method. In an alternative example, the processor 32 may acquire the SOC of each of the cells 40 of the battery 24.

Further, the processor 32 may acquire a charging possible time and a standby time (step S1). The charging possible time may be a time during which performing the charging from the external power supply is possible. The standby time may be a time until which the charging is started. For example, the processor 32 may acquire the charging possible time and the standby time by an input operation performed by a user. In an alternative example, the processor 32 may acquire the charging possible time and the standby time from the external power supply, or by any other method.

Thereafter, the processor 32 may determine whether performing the partial charging is better in the charging efficiency than performing the regular charging, on the basis of the SOC of the battery 24 and the charging possible time (step S2). For example, the processor 32 may make the determination by referring to a charging map. The charging map may include an expected charging amount by the partial charging and an expected charging amount by the regular charging that are associated with the SOC of the battery 24 and the charging possible time. The processor 32 may refer to the charging map to derive the expected charging amount by the partial charging and the expected charging amount by the regular charging, and may determine one of the partial charging and the regular charging by which the expected charging amount is larger as the charging that is better in the charging efficiency.

If the processor 32 determines that performing the partial charging is better in the charging efficiency than performing the regular charging (step S2: YES), the processor 32 may determine whether it is possible to move the electric charge from the first cells 40a to the second cells 40b, on the basis of the SOC of the battery 24 and the standby time (step S3). For example, the processor 32 may make the determination by referring to an electric charge movement map. The electric charge movement map may include information associated with first information, the SOC of the battery 24 and the standby time. The first information indicates whether or not the move of the electric charge from the first cells 40a to the second cells 40b, to allow the partial charging is possible. For example, the steps S2 and S3 may correspond to the predetermined conditions described above.

If the processor 32 determines that performing the partial charging is not better in the charging efficiency than performing the regular charging (step S2: NO) and that it is not possible to move the electric charge from the first cells 40a to the second cells 40b (step S3: NO), the processor 32 may perform the regular charging (step S4).

If the processor 32 determines that it is possible to move the electric charge from the first cells 40a to the second cells 40b (step S3: YES), the processor 32 may control the step-up step-down circuit 30 to move the electric charge from the first cells 40a to the second cells 40b (step S5).

Thereafter, the processor 32 may determine whether the movement of the electric charge from the first cells 40a to the second cells 40b is completed (step S6). Here, for example, the processor 32 may determine whether the external power supply is coupled and the charging is started after an elapse of the standby time. If the processor 32 determines that the movement of the electric charge from the first cells 40a to the second cells 40b is completed (step S6: YES), the processor 32 may perform the partial charging (step S7).

If the processor 32 determines that the movement of the electric charge from the first cells 40a to the second cells 40b is not completed (step S6: NO), e.g., determines that the external power supply is coupled and the charging is started before the elapse of the standby time, the processor 32 may perform the regular charging and control the step-up step-down circuit 30 to perform the cell balancing that causes the SOCs of the respective cells 40 to be equal to each other (step S8).

After an elapse of the charging possible time, the processor 32 may determine whether the SOCs of the respective cells 40 are the same as each other (step S9). For example, to determine whether the SOCs of the respective cells 40 are the same as each other, the processor 32 may determine whether the SOCs of the respective cells 40 do not differ between the cells 40 to the extent that it is not necessary to perform the cell balancing. If the processor 32 determines that the SOCs of the respective cells 40 are the same as each other (step S9: YES), the processor 32 may end the charging control process.

If the processor 32 determines that the SOCs of the respective cells 40 are not the same as each other (step S9: NO), the processor 32 may perform the cell balancing that causes the SOCs of the respective cells 40 to be the same as each other (step S10), and may end the charging control process.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the number of first cells 40a and the number of second cells 40b may be fixed in an example embodiment described above. In some embodiments, a switch, a relay, or the like configured to change a connection relationship of the charger 26 and the step-up step-down circuit 30 versus the respective cells 40 may be provided. The switch, the relay, or the like may be switched to change the number of first cells 40a and the number of second cells 40b. This configuration makes it possible to perform the charging more efficiency. However, it should be noted that an example embodiment in which the number of first cells 40a and the number of second cells 40b are fixed allows for a simplification of an apparatus as a whole.

The step-up step-down circuit 30 may be provided as the electric charge mover in an example embodiment described above. However, it is sufficient for the electric charge mover to move the electric charge between the first cells 40a and the second cells 40b. Accordingly, in some embodiments, the electric charge mover may be an active cell balancing device or the like.

The charging control process described in the foregoing example embodiment is illustrative and exemplary only. Performing at least the partial charging suffices in the charging control process. Accordingly, the order of steps of the charging control process is not limited to those of the charging control process described above. The processor 32 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 32. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 32 illustrated in FIG. 1.

The invention claimed is:

1. A charging control apparatus comprising:
   a battery including multiple cells;
   an electric charge mover configured to move electric charge among the cells; and
   a processor configured to, upon charging the battery, cause the electric charge mover to move the electric charge of one or more cells serving as a part of the multiple cells to another one or more cells of the multiple cells, and perform a partial charging that charges the one or more cells serving as the part of the multiple cells after causing the electric charge mover to move the electric charge.

2. The charging control apparatus according to claim 1, wherein the processor is configured to perform any of a regular charging and the partial charging on a basis of a predetermined condition, the regular charging being configured to charge the multiple cells.

3. The charging control apparatus according to claim 2, wherein the processor is configured to perform any of the regular charging and the partial charging, on a basis of a standby time, a charging possible time, and a charging rate of the battery, the standby time being a time until which the charging of the battery is started, the charging possible time being a time during which performing the charging of the battery is possible.

4. The charging control apparatus according to claim 1, wherein the processor is configured to perform a cell balancing of the multiple cells after performing the partial charging.

5. The charging control apparatus according to claim 2, wherein the processor is configured to perform a cell balancing of the multiple cells after performing the partial charging.

6. The charging control apparatus according to claim 3, wherein the processor is configured to perform a cell balancing of the multiple cells after performing the partial charging.

7. The charging control apparatus according to claim 1, wherein
   each of the multiple cells is set in advance to any of a first cell and a second cell, and
   the processor is configured to cause the electric charge of one or more first cells to be moved to one or more second cells, and charge the one or more first cells upon the partial charging after causing the electric charge of the one or more first cells to be moved to the one or more second cells.

8. The charging control apparatus according to claim 2, wherein
   each of the multiple cells is set in advance to any of a first cell and a second cell, and
   the processor is configured to cause the electric charge of one or more first cells to be moved to one or more second cells, and charge the one or more first cells upon the partial charging after causing the electric charge of the one or more first cells to be moved to the one or more second cells.

9. The charging control apparatus according to claim 3, wherein
each of the multiple cells is set in advance to any of a first cell and a second cell, and
the processor is configured to cause the electric charge of one or more first cells to be moved to one or more second cells, and charge the one or more first cells upon the partial charging after causing the electric charge of the one or more first cells to be moved to the one or more second cells.

10. The charging control apparatus according to claim 4, wherein
each of the multiple cells is set in advance to any of a first cell and a second cell, and
the processor is configured to cause the electric charge of one or more first cells to be moved to one or more second cells, and charge the one or more first cells upon the partial charging after causing the electric charge of the one or more first cells to be moved to the one or more second cells.

11. The charging control apparatus according to claim 5, wherein
each of the multiple cells is set in advance to any of a first cell and a second cell, and
the processor is configured to cause the electric charge of one or more first cells to be moved to one or more second cells, and charge the one or more first cells upon the partial charging after causing the electric charge of the one or more first cells to be moved to the one or more second cells.

12. The charging control apparatus according to claim 6, wherein
each of the multiple cells is set in advance to any of a first cell and a second cell, and
the processor is configured to cause the electric charge of one or more first cells to be moved to one or more second cells, and charge the one or more first cells upon the partial charging after causing the electric charge of the one or more first cells to be moved to the one or more second cells.

\* \* \* \* \*